United States Patent
Ito et al.

(10) Patent No.: US 9,221,448 B2
(45) Date of Patent: Dec. 29, 2015

(54) VEHICLE BRAKE HYDRAULIC PRESSURE CONTROL APPARATUS

(71) Applicant: NISSIN KOGYO CO., LTD., Ueda, Nagano (JP)

(72) Inventors: Masanori Ito, Nagano (JP); Nobuyuki Nomura, Nagano (JP)

(73) Assignee: NISSIN KOGYO CO., LTD, Nagano (JP)

( * ) Notice: Subject to any disclaimer, the term of this patent is extended or adjusted under 35 U.S.C. 154(b) by 0 days.

(21) Appl. No.: 14/047,466

(22) Filed: Oct. 7, 2013

(65) Prior Publication Data

US 2014/0100752 A1    Apr. 10, 2014

(30) Foreign Application Priority Data

Oct. 9, 2012    (JP) ................................ 2012-224201

(51) Int. Cl.
| | |
|---|---|
| *B60T 13/66* | (2006.01) |
| *B60T 7/04* | (2006.01) |
| *B60T 7/12* | (2006.01) |
| *B60W 30/18* | (2012.01) |

(52) U.S. Cl.
CPC .............. *B60T 13/662* (2013.01); *B60T 7/042* (2013.01); *B60T 7/122* (2013.01); *B60T 2201/06* (2013.01); *B60W 30/18018* (2013.01)

(58) Field of Classification Search
CPC ....... B60T 13/662; B60T 7/042; B60T 7/122; B60T 2201/06; B60W 30/18018
See application file for complete search history.

(56) References Cited

U.S. PATENT DOCUMENTS 8,108,116 B2 *  1/2012  Mori et al. ....................... 701/70
2012/0190500 A1 *  7/2012  Yamada et al. ............... 477/184

FOREIGN PATENT DOCUMENTS

| JP | 2000313253 A | 11/2000 |
|---|---|---|
| JP | 2009190485 | 8/2009 |

(Continued)

OTHER PUBLICATIONS

Japanese Office Action for related Application No. 2012-224201, drafted on Aug. 7, 2014 and issued on Aug. 19, 2014, 4 pages.

(Continued)

*Primary Examiner* — Mussa A Shaawat
*Assistant Examiner* — Kelly D Williams
(74) *Attorney, Agent, or Firm* — Andrew M. Calderon; Roberts, Mlotkowski, Safran & Cole, P.C.

(57) ABSTRACT

A vehicle brake hydraulic pressure control apparatus includes an acquiring section, first and second control quantity calculators, and a holding section. The acquiring section acquires engine restarting information. The first control quantity calculator calculates a first control quantity. The second control quantity calculator calculates a second control quantity larger than the first control quantity. The holding section holds a brake hydraulic pressure. If the brake hydraulic pressure lowers from a point in time when the vehicle is stopped to a point in time when the acquiring section acquires the engine restarting information, the holding section holds the brake hydraulic pressure with the first control quantity. If the acquiring section acquires the engine restarting information, the holding section holds the brake hydraulic pressure with the second control quantity. If the restarting of the engine is completed, the holding section holds the brake hydraulic pressure with the first control quantity).

15 Claims, 8 Drawing Sheets

(56) References Cited

FOREIGN PATENT DOCUMENTS

| | | |
|---|---|---|
| JP | 201291714 | 5/2012 |
| WO | WO-2012043641 | 4/2012 |
| WO | WO-2012046299 | 4/2012 |
| WO | WO-2012043461 | 4/2014 |

OTHER PUBLICATIONS

European Search Report for related Application No. 13187857.1-1756 dated Feb. 10, 2014, 7 pages.

* cited by examiner

VEHICLE BRAKE HYDRAULIC PRESSURE CONTROL APPARATUS

CROSS REFERENCE TO RELATED APPLICATION

This application is based on and claims priority under 35 U.S.C. §119 to Japanese Patent Application No. 2012-224201 (filed on Oct. 9, 2012), the entire contents of which are incorporated herein by reference.

BACKGROUND

1. Technical Field

The invention relates to a vehicle brake hydraulic pressure control apparatus.

2. Related Art

JP 2000-313253 A describes a vehicle brake hydraulic pressure control apparatus that controls to hold the braking force of a vehicle when the vehicle is stopped. The vehicle brake hydraulic pressure control apparatus holds the braking force of the vehicle while an engine of the vehicle is automatically stopped, and reduces the braking force according to a driving force of the engine when the engine is restarted.

SUMMARY

However, when the engine is restarted, a reduction in power supply voltage as a result of cranking the engine may affect current values of solenoid valves that hold brake fluid. Therefore, the current values (control quantities) of the solenoid valves may be lowered below an indicated current value.

One embodiment of the invention provides a vehicle brake hydraulic pressure control apparatus that can hold a brake hydraulic pressure at an appropriate control quantity even though a power supply voltage is reduced when an engine is restarted.

According to an aspect of the invention, a vehicle brake hydraulic pressure control apparatus can hold a brake hydraulic pressure when a vehicle is stopped. The apparatus includes an acquiring section, a first control quantity calculator, a second control quantity calculator, and a holding section. The acquiring section acquires engine restarting information. When the vehicle is stopped, the first control quantity calculator calculates a first control quantity which corresponds to a brake hydraulic pressure to hold a stopped state of the vehicle. The second control quantity calculator calculates a second control quantity which is larger by a predetermined quantity than the first control quantity. The holding section holds the brake hydraulic pressure while the vehicle is stopped. If the brake hydraulic pressure lowers to a predetermined pressure after the vehicle is stopped, the holding section holds the brake hydraulic pressure with the first control quantity. If the acquiring section acquires the engine restarting information, the holding section holds the brake hydraulic pressure with the second control quantity. If the restarting of the engine is completed, the holding section holds the brake hydraulic pressure with the first control quantity.

With this configuration, even though the power supply voltage is reduced when the engine is restarted, the brake hydraulic pressure is held with the second control quantity which is higher than the first control quantity. Therefore, it is possible to suppress the reduction in brake hydraulic pressure. In addition, when the brake hydraulic pressure is reduced before the engine is restarted, the brake hydraulic pressure is held with the first control quantity. Therefore, it is possible to restrain the brake hydraulic pressure held from becoming too high as compared with, for example, a case in which the brake hydraulic pressure is held with the second control quantity.

Also, in the above configuration, the holding section may hold the brake hydraulic pressure with the second control quantity at a point in time at which the acquiring section acquires the engine restarting information.

Also, in the above configurations, the first and second control quantities may be values of currents which are supplied to a proportional solenoid valve which can control the brake hydraulic pressure.

With this configuration, it is possible to suppress the heating of the drive circuit by reducing the current value supplied to the proportional solenoid valves.

According to the invention, even though the power supply voltage is reduced when the engine is restarted, it is possible to hold the brake hydraulic pressure with the appropriate control quantity.

DETAILED DESCRIPTION

First Embodiment

Next, referring to the drawings as required, a first embodiment of the invention will be described.

Figure 1:
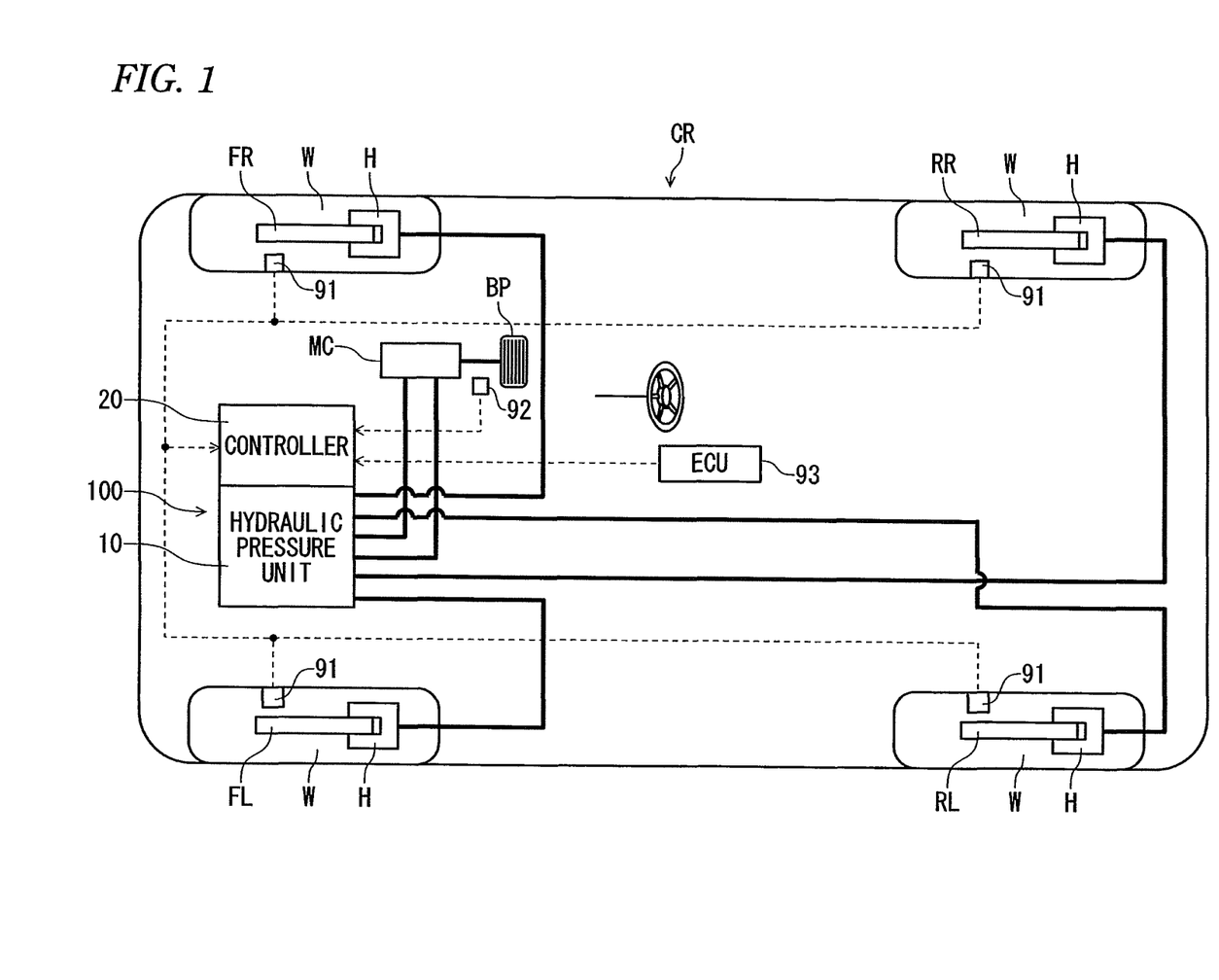
FIG. 1 is a block diagram of a vehicle including a vehicle brake hydraulic pressure control apparatus according to a first embodiment of the invention.

As shown in FIG. 1, a vehicle brake hydraulic pressure control apparatus 100 is intended to control braking forces (brake hydraulic pressures) to act on wheels W of a vehicle CR as required. The vehicle brake hydraulic pressure control apparatus 100 includes a hydraulic pressure unit 10 and a controller 20. In the hydraulic pressure unit 10, fluid lines (hydraulic pressure lines) and various components are provided. The controller 20 controls the various components in the hydraulic pressure unit 10 as required.

In addition, wheel speed sensors 91, a brake pedal sensor 92, and an ECU (Engine Control Unit) 93 are connected to the controller 20 of the vehicle brake hydraulic pressure control apparatus 100. The wheel speed sensors 91 detect speeds of the corresponding wheels W. The brake pedal sensor 92 detects the depression (ON) of and release of depression (OFF) from a brake pedal BP. The ECU (Engine Control Unit) 93 controls an engine of the vehicle. The detection results of the sensors 91, 92 and information on the ECU 93 are output to the controller 20.

The controller 20 includes, for example, a CPU, a RAM, a ROM and an input/output circuit and executes controls by performing various operations based on inputs from the wheel speed sensors 91, the brake pedal sensor 92 and the ECU 93, as well as programs and data stored in the ROM.

In addition, wheel cylinders H are hydraulic devices that converts a brake hydraulic pressure generated by a master cylinder MC and the vehicle brake hydraulic pressure control apparatus 100 into operation forces acting on wheel brakes FR, FL, RR, RL which are provided on the wheels W. The respective wheel cylinders H are connected to the hydraulic pressure unit 10 of the vehicle brake hydraulic pressure control apparatus 100 by way of piping.

Figure 2:
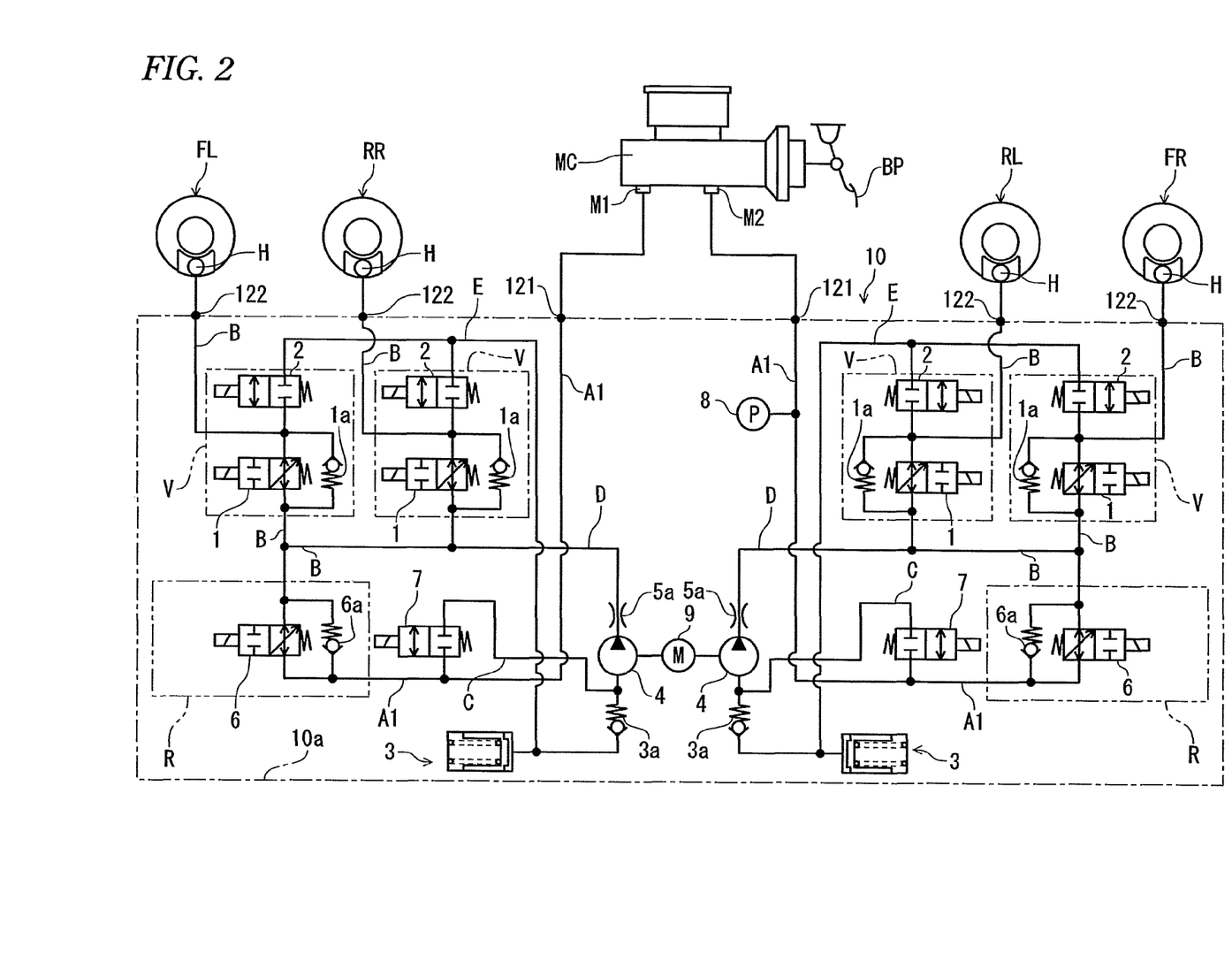
FIG. 2 is a brake hydraulic pressure circuit diagram of the vehicle brake hydraulic pressure control apparatus.

As shown in FIG. 2, the hydraulic pressure unit 10 of the vehicle brake hydraulic pressure control apparatus 100 is disposed between the master cylinder MC and the wheel brakes FR, FL, RR, RL. The master cylinder MC serves as a hydraulic pressure source from which a brake hydraulic pressure according to an effort applied to the brake pedal BP by the driver is generated. The hydraulic pressure unit 10 includes a pump body 10a, plural inlet valves 1, and plural outlet vales 2. The pump body 10a is a base body having fluid lines through which brake fluid flows. The inlet valves 1 and the outlet valves 2 are disposed in the fluid lines. Two output ports M1, M2 of the master cylinder MC are connected to inlet ports 121 of the pump body 10a. Output ports 122 of the pump body 10a are connected respectively to the wheel brakes FR, FL, RR, RL. Then, normally, the fluid lines communicate from the inlet ports 121 to the outlet ports 122 within the pump body 10a. Thereby, the effort applied to the brake pedal BP is transmitted to the wheel brakes FL, RR, RL, FR.

Here, a fluid line which starts from the output port M1 communicates with the wheel brake FL of the left front wheel and the wheel brake RR of the right rear wheel. A fluid line starting from the output port M2 communicates with the wheel brake FR of the right front wheel and the wheel brake RL of the left rear wheel. It is noted that in the following description, the fluid line starting from the output port M1 will be referred to as a "first system" and the fluid line starting from the output port M2 will be referred to as a "second system."

In the hydraulic pressure unit 10, two control valve units V are provided in the first system so as to correspond to the wheel brakes FL, RR. Similarly, in the second system, two control valve units V are provided so as to correspond to the wheel brakes RL, FR. Additionally, in the hydraulic pressure unit 10, a reservoir 3, a pump 4, an orifice 5a, a pressure regulator (regulator) R, and a suction valve 7 are provided for each of the first system and the second system. In addition, in the hydraulic pressure unit 10, a common motor 9 is provided which drives both the pump 4 of the first system and the pump 4 of the second system. This motor 9 is a rotation speed controllable motor. In this embodiment, the rotational speed of the motor 9 is controlled through a duty control. In addition, in this embodiment, a pressure sensor 8 is provided only for the second system.

It is noted that in the following description, the fluid lines starting from the output ports M1, M2 of the master cylinder MC and reaching the pressure regulators R will be referred to as an "output hydraulic pressure line A1." Fluid lines starting from the pressure regulator R in the first system and reaching the wheel brakes FL, RR and fluid lines starting from the pressure regulator R in the second system and reaching the wheel brakes RL, FR will be referred to as a "wheel hydraulic pressure line B." In addition, fluid lines starting from the output hydraulic pressure lines A1 and reaching the pumps 4 will be referred to as a "suction hydraulic pressure line C." Fluid lines starting from the pumps 4 and reaching the wheel hydraulic pressure lines B will be referred to as a "discharge hydraulic pressure line D." Further, fluid lines starting from the wheel hydraulic pressure lines B and reaching the suction hydraulic pressure lines C will be referred to as a "release line E."

The control valve units V are valves that control the transmission of hydraulic pressure from the master cylinder MC or the pumps 4 to the wheel brakes FL, RR, RL, FR (specifically, the wheel cylinders H). The control valve units V can increase, hold or reduce the pressures at the wheel cylinders H. Because of this, the control valve units V each include the inlet valve 1, the outlet valve 2 and a check valve 1a.

The inlet valves 1 are normally open proportional solenoid valves which are provided between the wheel brakes FL, RR, RL, FR and the master cylinder MC, that is, in the wheel hydraulic pressure lines B. Because of this, a differential pressure between an upstream and a downstream of the inlet valve 1 can be regulated according to a value of a drive current flowing to the inlet valve 1.

The outlet valves 2 are normally closed solenoid valves which are disposed between the wheel brake FL, RR, RL, FR and the reservoirs 3, that is, between the wheel hydraulic pressure lines B and the release lines E. Although the outlet valves 2 are normally closed, when the wheels W are about to be locked, the outlet valves 2 are released by the controller 20, whereby the brake hydraulic pressures acting on the wheel brakes FL, RR, RL, FR are allowed to escape into the corresponding reservoirs 3.

The check valves 1a are connected to the corresponding inlet valves 1 in parallel. The check valves 1a are valves which only permit brake fluid to flow from the wheel brakes FL, FR, RL, RR towards the master cylinder MC. When the input from the brake pedal BP is cancelled, even though the inlet valves 1 are kept closed, the check valves 1a permit brake fluid to flow from the wheel brakes FL, FR, RL, RR towards the master cylinder MC.

The reservoirs 3 are provided in the release lines E. The reservoirs 3 have a function of temporarily reserving brake fluid which escapes from the outlet valves 2 when the outlet valves 2 are opened. In addition, a check valve 3a is disposed between the reservoir 3 and the pump 4 for permitting only a flow of brake fluid from the reservoir 3 towards the pump 4.

The pumps 4 are disposed between the suction hydraulic pressure line C, which communicate with the output hydraulic pressure lines A1, and the discharge hydraulic pressure lines D, which communicate with the wheel hydraulic pressure lines B. The pumps 4 have a function of suctioning the brake fluid reserved in the reservoirs 3 so as to discharge the reserved brake fluid to the discharge hydraulic pressure lines D. By this function, not only can the brake fluid suctioned by the reservoirs 3 be returned to the master cylinder MC but also braking forces can be generated at the wheel brakes FL, RR, RL, FR by, for example, generating a brake hydraulic pressure irrespectively of whether or not the brake pedal BP is operated.

It is noted that a discharge quantity of brake fluid discharged by the pump 4 depends on a rotational speed (duty ratio) of the motor 9. Namely, the discharge amount of brake fluid discharged by the pump 4 increases as the rotational speed (duty ratio) of the motor 9 increases.

The orifices 5a attenuate pulsation produced by the pressure of brake fluid discharged from the pump 4.

The pressure regulators R each have not only a function of normally permitting a flow of brake fluid from the output hydraulic pressure lines A1 towards the wheel hydraulic pressure lines B but also a function of controlling (regulating) the pressures in the wheel hydraulic pressure lines B and at the wheel cylinders H to a set value or lower while blocking the normal flow of brake fluid when it is attempted to increase the pressures at the wheel cylinders H by the brake fluid pressures generated by the pumps 4.

Selector valves 6 are normally open proportional solenoid valves which are disposed between the output hydraulic pressure lines A1, which communicate with the master cylinder MC, and the wheel hydraulic pressure lines B, which communicate with the wheel brakes FL, FR, RL, RR. Although not shown in detail, a valve body of each selector valve 6 is biased in a valve closing direction by an electromagnetic force corresponding to a current imparted. When the pressure in the wheel hydraulic pressure line B becomes higher by a predetermined value (this predetermined value depending upon the current imparted) than that in the output hydraulic pressure line A1, the brake fluid escapes from the wheel hydraulic pressure line B to the output hydraulic pressure line A1, whereby the pressure on the wheel hydraulic pressure line B side (the brake hydraulic pressures at the wheel brakes FL, FR, RL, RR) are controlled to a predetermined pressure. Namely, by changing arbitrarily a valve closing force according to a value of a drive current input to each selector valve 6 (an indicated current value), a differential pressure between an upstream side and a downstream side of the selector valve 6 is adjusted, to thereby make it possible to control the pressure in the wheel hydraulic pressure line B to a set value or lower.

Check valve 6a are connected parallel to the corresponding selector valves 6. Each check valve 6a is a one-way valve which permits a flow of brake fluid from the output hydraulic pressure line A1 to the wheel hydraulic pressure line B.

The suction valves 7 are normally closed solenoid valves which are provided in the suction hydraulic pressure lines C. The suction valves 7 switch the suction hydraulic pressure lines C between a release state and a block state. For example, when the hydraulic pressures at the wheel brakes FL, FR, RL, RR are increased by the pumps 4, the suction valves 7 are controlled by the controller 20 to be opened.

The pressure sensor 8 detects a brake hydraulic pressure in the output hydraulic pressure line A1. The detection result of the pressure sensor 8 is input into the controller 20.

Figure 3:
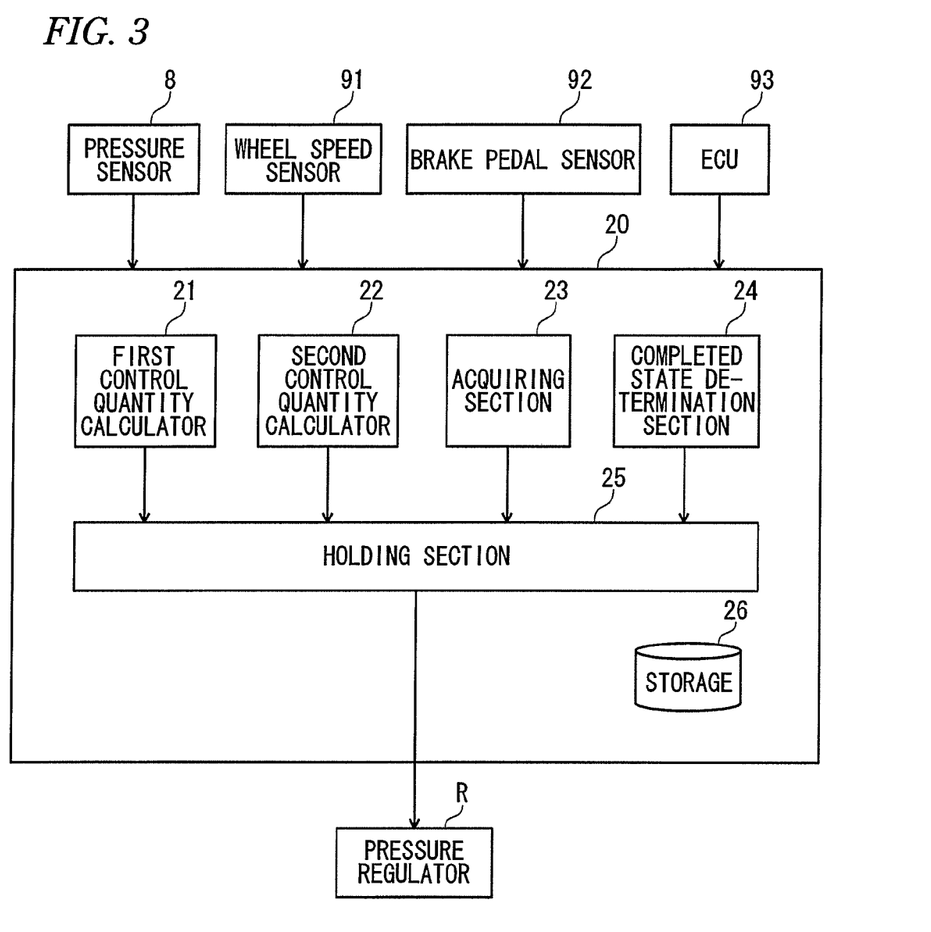
FIG. 3 is a block diagram of a controller.

Next, the controller 20 will be described in detail.

As shown in FIG. 3, the controller 20 is configured to hold the brake hydraulic pressure when the vehicle CR is stopped, by controlling mainly the opening and closing of the regulator valves R (the selector valves 6) based on signals (information) input from the pressure sensor 8, the wheel speed sensors 91, the brake pedal sensor 92, and the ECU 93. The controller 20 includes a first control quantity calculator 21, a second control quantity calculator 22, an acquiring section 23, a completed state determination section 24, a holding section 25, and a storage 26.

Figure 5A:
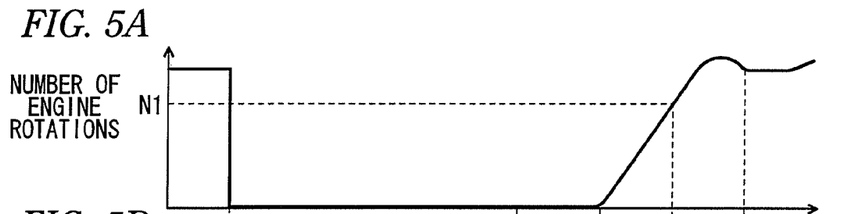
FIGS. 5A to 5F are time charts illustrating changes in parameters when an engine is restarted from an idle stop state.
Figures 5B, 5C:
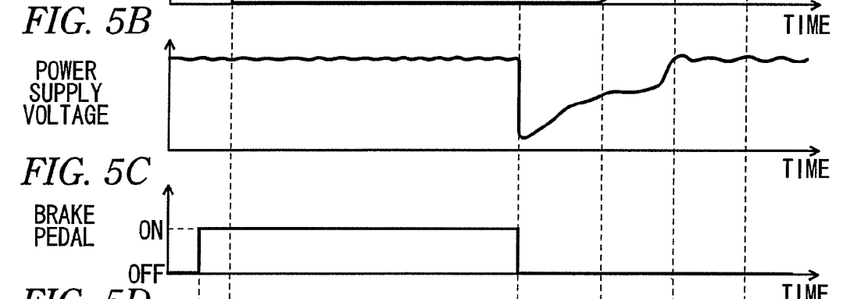
Figures 5D, 5E, 5F:
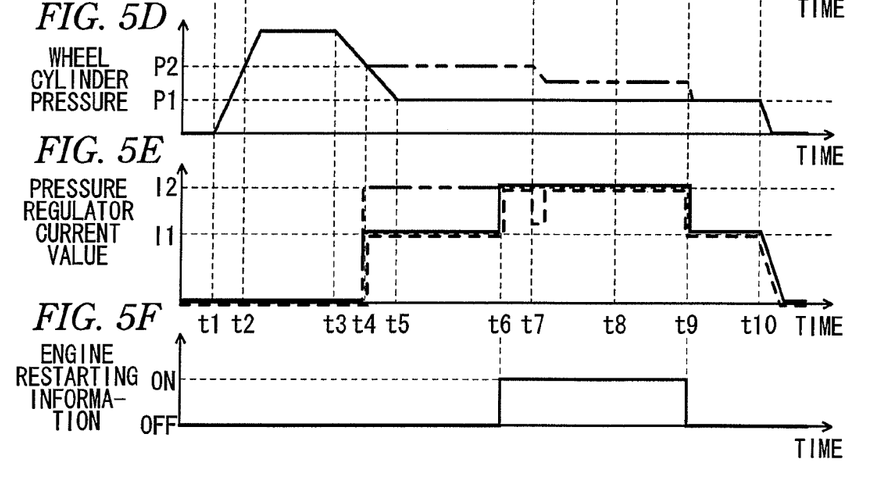

The first control quantity calculator 21 has a function of when the vehicle CR is stopped, calculating a first indicated current value I1 (refer to FIG. 5E; which is an example of a first control quantity corresponding to a wheel cylinder pressure P1 (refer to FIG. 5D) to maintain the stopped state of the vehicle CR. Here, the wheel cylinder pressure P1 to maintain the stopped state of the vehicle CR can be calculated by a known method. For example, the wheel cylinder pressure P1 is calculated based on a gradient of a road surface on which the vehicle CR is stopped.

The second control quantity calculator 22 has a function of calculating a second indicated current value I2 (refer to FIG. 5E), which is higher by a first predetermined quantity than the first indicated current value I1, by adding the first predetermine quantity stored in the storage 26 to the first indicated current value I1. Here, the first predetermined quantity may take any value as long as the value could prevent an actual current value (a current value indicated by a broken line in FIG. 5E), which flows to the pressure regulators R, from lowering below the first indicated current value I1 due to the effect of a supply voltage which is lowered temporarily when the engine is restarted. The first predetermined quantity may be set appropriately through experiments or simulations.

The acquiring section 23 has a function of acquiring engine restarting information that is output from the ECU 93 on the engine side. Here, it is started to output the engine restarting information from the ECU 93 on the engine side to the acquiring section 23 at a point in time slightly before the engine is actually restarted (refer to time t6 in FIG. 5F). When the restarting of the engine is completed, the output of the engine restarting information is stopped (refer to time t9 in FIG. 5F).

The completed state determination section 24 has a function of determining as to whether or not the restarting of the engine is completed. In this embodiment, the completed state determination section 24 is configured to determine that the restarting of the engine is completed if the number of engine rotations becomes a predetermined value N1 or larger as shown at time t9 in FIG. 5A.

Here, a time period (from time t7 to time t9) from a point in time (time t7) at which the engine is restarted to a point in time (t9) at which the number of engine rotations reaches the predetermined value N1 and a time (from time t7 to time t9) period until the power supply voltage is recovered to substantially 100% are substantially constant irrespective of a temperature condition and the like. Because of this, when it is determined that the engine is restarted completely by looking at the number of engine rotations, the power supply voltage (the voltage of the power supply which applies a voltage to the ECU 93 and the controller 20) is recovered to the normal state.

In this embodiment, the predetermined value N1 is set to the number of engine rotations at a time when the output of the power supply voltage, which is temporarily reduced when the engine is restarted (time t7), is recovered substantially 100%. However, the invention is not limited thereto. For example, the predetermined value N1 may be set to the number of engine rotations at a time when the power supply voltage, which is temporarily reduced, is recovered substantially 80%.

In addition, The completed state determination section 24 may determine as to whether or not the restarting of the engine is completed, not based on the number of engine rotations but based on whether or not the output of the engine restarting information becomes OFF (refer to time t9 in FIG. 5F).

The holding section 25 has a function to hold the wheel cylinder pressure by controlling the pressure regulators R at the set indicated current values. Specifically, the holding section 25 determines as to whether or not the vehicle is in an idle stop state in which the engine is temporarily stopped with the vehicle temporarily stopped. Here, the determination as to whether or not the vehicle is in the idle stop state should be made by using a known method. It is noted that the determination of the idle stop state is set as required based the conditions of the vehicle such as conditions in which wheel speeds output from the wheel speed sensors 91 and the number of engine rotations output from the ECU 93 are predetermined values or lower, and an ignition switch in an ON state.

When it is determined that the vehicle is in the idle stop state, the holding section 25 determines as to whether or not a master cylinder pressure output from the pressure sensor 8 becomes a predetermined value P2 or lower (refer to in FIG. 5D). Here, when no current flows to the pressure regulators R while the vehicle is in the idle stop state, the master cylinder pressure and the wheel cylinder pressure are substantially equal to each other. Therefore, in the following description, the master cylinder pressure will be described as the wheel cylinder pressure.

When the wheel cylinder pressure becomes the predetermined value P2 or lower while the vehicle is in the idle stop state, the holding section 25 sets the indicated current value for the pressure regulators R to the first indicated current value I1. Namely, when the wheel cylinder pressure lowers to the predetermined value P2 during a period from a point in time at which the idle stop operation is started to a point in time at which the engine is restarted, the holding section 25 holds the wheel cylinder pressure at the first indicated current value I1. Here, the predetermined value P2 is a larger value than the wheel cylinder pressure P1 to maintain the stopped state of the vehicle CR. The predetermined value P2 is set appropriately through experiments or simulations.

In addition, the holding section 25 also has a function of (i) determining as to whether or not the acquiring section 23 has acquired the engine restarting information while the vehicle is in the idle stop state and (ii) setting the indicated current value for the pressure regulators R to the second indicated current value I2 if the holding section 25 determines that the acquiring section 23 has acquired the engine restarting information. To describe this in more detail, the holding section 25 is configured to hold the wheel cylinder pressure at the second indicated current values I2 at a point in time at which the acquiring section 23 acquires the engine restarting information.

Additionally, the holding section 25 has a function of, when the completed state determination section 24 determines that the restarting of the engine is completed, changing the indicated current value from the second indicated current value I2 to the first indicated current value I1 so as to hold the wheel cylinder pressure at the first indicated current value I1. To describe this in more detail, when the completed state determination section 24 determines that the restarting of the engine is completed, the holding section 25 determines as to whether or not the driving force of the engine becomes stable based on the number of engine rotations. If it is determined that the driving force of the engine is not stable, the holding section 25 sets the indicated current value to the first indicated current value I1, whereas if it is determined that the driving force of the engine becomes stable, the holding section 25 gradually lowers the indicated current value from the first indicated current value I1. As a determination method for determining whether or not the driving force of the engine becomes stable, there are raised, for example, a method for determining whether or not a variation in engine speed per unit time becomes a predetermined value or lower and a method for determining whether or not the output of a torque converter becomes a constant value or larger.

Next, operations of the controller 20 will be described in detail with reference to a flowchart shown in FIG. 4. The controller 20 executes the flowchart shown in FIG. 4 repeatedly.

Figure 4:
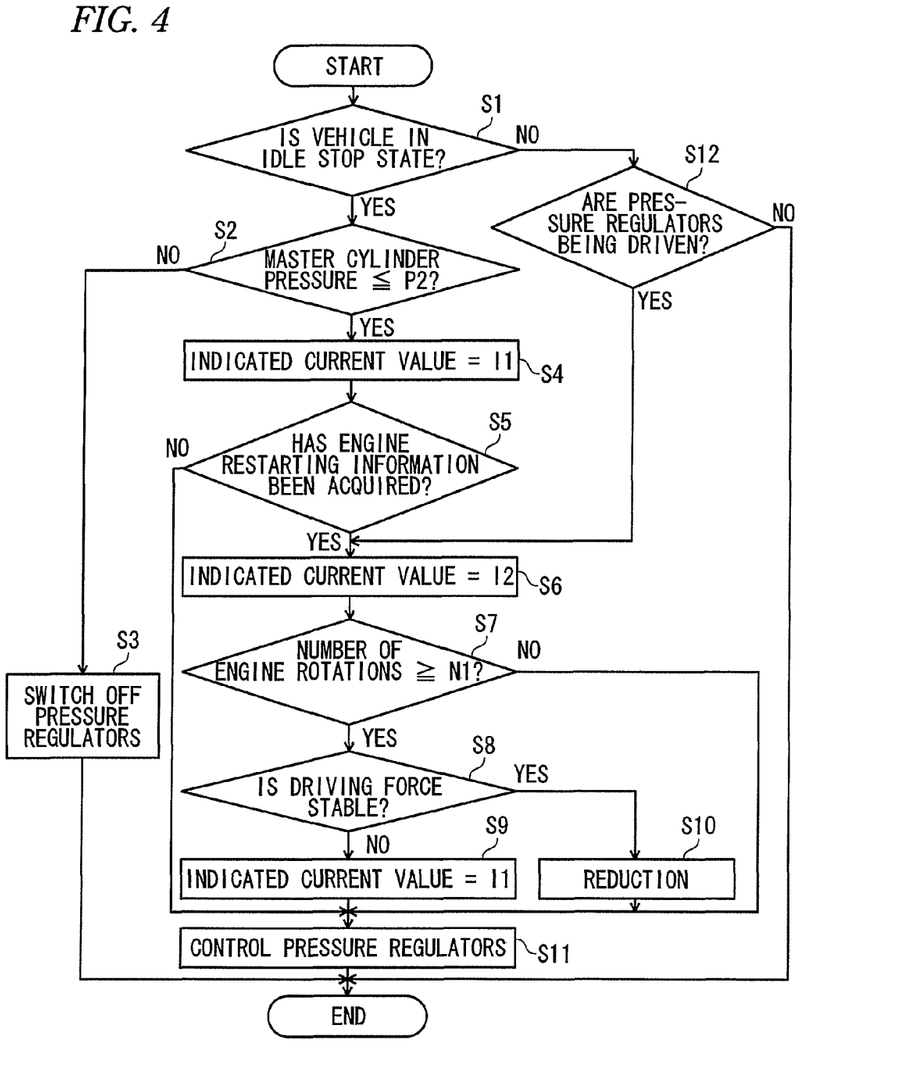
FIG. 4 is a flowchart showing operations of the controller.

In a control shown in FIG. 4, firstly, the controller 20 determines as to whether or not the vehicle CR is in the idle stop state (step S1). If it is determined at step S1 that the vehicle CR is in the idle stop state (Yes at step S1), the controller 20 determines as to whether or not the master cylinder pressure is equal to or smaller than the predetermined value P2 (step S2).

If it is determined at step S2 that the master cylinder pressure is larger than the predetermined value P2 (No at step S2), the controller 20 causes no current to flow through the pressure regulators R so as to keep the pressure regulators R in an OFF state (an opened state) (step S3) Then, the controller 20 ends this control. If it is determined at step S2 that the master cylinder pressure is equal to or smaller than the predetermined value P2 (Yes at step S2), in order to hold the brake hydraulic pressures, the controller 20 sets the indicated current value to the first indicated current value I1 (step S4).

After step S4, the controller 20 determines as to whether or not the acquiring section 23 has acquired the engine restarting information (step S5). If it is determined at step S5 that the acquiring section 23 has not acquired the engine restarting information (No at step S5), the controller 20 controls the pressure regulators R at the set first indicated current value I1 (step S11). If it is determined at step S5 that the acquire section 23 has acquired the engine restarting information (Yes at step S5), the controller 20 sets the indicated current value to the second indicated current value I2 (step S6).

After step S6, the controller 20 determines as to whether or not the number of engine rotations is equal to or larger than the predetermined value N1 (step S7). If it is determined at step S7 that the number of engine rotations is smaller than the predetermined value N1 (No at step S7), the controller 20 controls the pressure regulators R at the indicated current value (that is, the second indicated current value I2) set at step S6 (step S11).

If it is determined at step S7 that the number of engine rotations is equal to or larger than the predetermined value N1 (Yes at step S7), the controller 20 determines as to whether or not the driving force of the engine becomes stable (step S8). If it is determined at step S8 that the driving force is not stable (No at step S8), the controller 20 switches the indicated current value to the first indicated current value I1 (step S9) and controls the pressure regulators R at this first indicated current value I1 (step S11).

If it is determined at step S8 that the driving force is stable (Yes at step S8), the controller 20 sets the indicated current value to a value which is obtained by reducing the previous indicated current value by a predetermined quantity (step S10) and controls the pressure regulators R at this indicated current value.

In addition, if it is determined at step S1 that the vehicle CR is not in the idle stop state (No at step S1), the controller 20 determines as to whether or not the pressure regulators R are being driven (step S12). If it is determined at step S12 that the pressure regulators R are being driven (Yes at step S12), the control proceeds to the operation in step S6. If it is determined at step S12 that the pressure regulators R are not being driven (No at step S12), the controller 20 ends the control then.

Next, an example of setting the indicated current value at which the pressure regulators R are controlled when the engine is restarted from the idle stop state will be described with reference to FIG. 5.

As shown in FIG. 5C, when an idle stop condition is met after the driver depresses the brake pedal BP (at time t1), the engine is stopped automatically and the number of engine rotations drops to zero as shown in FIG. 5A (at time t2). Thereafter, when the driver slightly releases the pedal effort applied to the brake pedal BP while the vehicle is in the idle stop state, the wheel cylinder pressure (the master cylinder pressure) is lowered gradually as shown at in FIG. 5D (between time 3 and time 5).

Then, when the wheel cylinder pressure drops to the predetermined value P2 at time t4, the indicated current value is set to the first indicated current value I1 as shown in FIG. 5E, and the pressure regulators R are controlled at this indicated current value. Thereby, as shown in FIG. 5D, the wheel cylinder pressure is surely held at the predetermined value P1.

Thereafter, when the engine restarting information is output (acquired) as shown in FIG. 5F (at time t6), the indicated current value is changed to the second indicated current value I2 as shown in FIG. 5E. After the engine restarting information is output, as shown in FIG. 5B, the engine is actually restarted. Thereby, the power supply voltage drops temporarily (at time t7). When the engine is restarted, the indicated current value is kept set to the second indicated current value I2 as shown in FIG. 5E. Therefore, even though the actual current value is lowered as indicated by the broken line in FIG. 5E due to the temporary drop in the power supply voltage, it is possible to restrain this current value from lowering below the first indicated current value I1.

Thereby, even if the power supply voltage is lowered in restarting the engine. the wheel cylinder pressure is surely held at the predetermined value P1 as shown at in FIG. 5D. Thereafter, as shown in FIG. 5A, the number of engine rotations starts to rise (at time t8) and continues so. When the number of engine rotations reaches the predetermined value N1 (at time t9), the indicated current value is switched from the second indicated current value I2 to the first indicated current value I1 as shown in FIG. 5E.

Thereby, when the number of engine rotations reaches the predetermined value N1, that is, when the power supply voltage is recovered to the normal state, the indicated current value is switched to the first indicated current value I1 which is smaller than the second indicated current value I2. Therefore, it is possible to mitigate the heat and load which would be generated in and applied to the pressure regulators R if the pressure regulators R were to continue to be controlled at the second indicated current value I2 which is larger without the switch to the first indicated current value I1. It is noted that when the indicated current value is switched to the first indicated current value I1, which is smaller than the second indicated current value I2, the power supply voltage has recovered to the normal state. Therefore, as shown in FIG. 5D, the wheel cylinder pressure is surely held at the predetermined value P1.

Thereafter, when the driving force of the engine (the number of engine rotations) becomes stable (at time t10) as shown in FIG. 5A, the indicated current value is reduced gradually as shown in FIG. 5E. In association with this gradual decrease in the indicated current value, the wheel cylinder pressure is also reduced gradually as shown in FIG. 5D.

Thus, in this embodiment, in addition to the advantage described above, the following advantage can be obtained.

As shown in FIGS. 5D and 5E, when the wheel cylinder pressure starts to lower (at time t3) before the acquiring section 23 acquires the engine restarting information, the wheel cylinder pressure is held at the first indicated current value I1. In this case, as compared, for example, with the configuration in which the wheel cylinder pressure is held at the second indicated current value I2 (refer to a chain double-dashed line in FIG. 5E), it is possible to suppress an excessive increase of the held wheel cylinder pressure between time t4 and time t7. Therefore, in this embodiment, as compared with the comparative example indicated by the chain double-dashed line in FIG. 5E, the value of the current that flows through the pressure regulators R between time t4 and time t7 can be reduced. Accordingly, it is possible to suppress the generation of heat in the drive circuit.

In addition, in the comparative example indicated by the chain double-dashed line in FIG. 5E, the wheel cylinder pressure is held at the higher value P2 while the vehicle is in the idle stop state. Therefore, if the value of the current value that flows though the pressure regulators R drops drastically, for example, when the restarting of the engine is completed (at time t9), the wheel cylinder pressure also drops drastically, which may result in that the pressure regulators R vibrate, producing abnormal noise.

In contrast with this, in this embodiment, the wheel cylinder pressure is held at the lower value P1 (the hydraulic pressure to hold the vehicle CR in the stopped state) while the vehicle is in the idle stop state. Consequently, such a situation does not take place thereafter that the brake fluid flows from the pressure regulators R to the master cylinder MC side, so long as the current value fluctuates within a range which is higher than the first indicated current value I1. Accordingly, in this embodiment, it is possible to suppress the production of abnormal noise that may otherwise result from a drastic drop in wheel cylinder pressure.

Additionally, the indicated current value is switched to the second indicated current value I2 at the point in time at which the acquiring section 23 acquires the engine restarting information, which is output slightly before the engine is actually restarted. Therefore, as compared with, for example, a case in which the indicated current value is switched a predetermined period of time after the acquiring section 23 acquires the engine restarting information, the indicated current value can be surely switched to the second indicated current value I2 when the engine is actually restarted. Thereby, it possible to surely restrain the wheel cylinder pressure from being affected by the reduction in power supply voltage.

In addition, it is determined as to whether or not the engine is restarted, based on the number of engine rotations. Therefore, it is possible to properly determine as to whether or not the engine has been restarted. For example, if it is determined as to whether or not the engine is restarted based on the value of the power supply voltage, an erroneous determination may be made as a result of the power supply voltage being fluctuated by other factors. However, it is possible to prevent such an erroneous determination from being made by making the determination as to the restarting of the engine based on the number of engine rotations.

Second Embodiment

Next, referring to the drawings, a second embodiment of the invention will be described in detail. It is noted that since this embodiment is such that the controller 20 of the first embodiment is partially modified, like reference numerals will be given to like constituent elements to those of the first embodiment, and the description thereof will be omitted herein.

Figure 6:
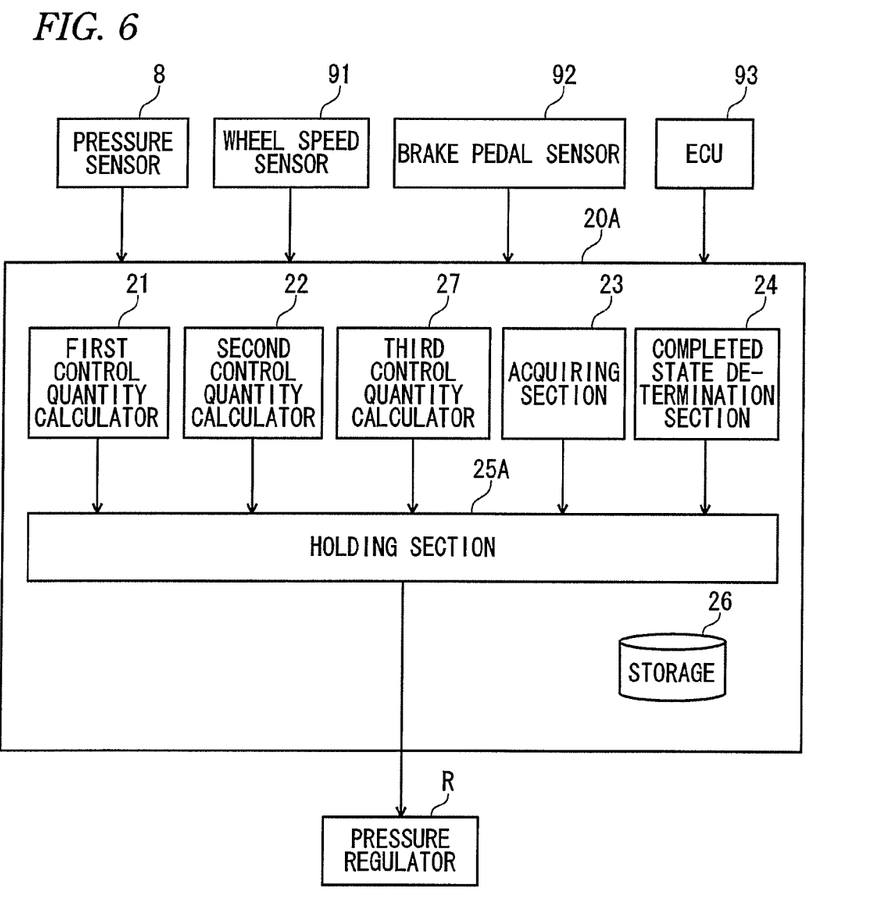
FIG. 6 is a block diagram of a controller according to a second embodiment.

As shown in FIG. 6, a controller 20A according to the second embodiment has the first control quantity calculator 21, the second control quantity calculator 22, the acquiring section 23, the completed state determination section 24, and the storage 26, which are substantially the same as those of the first embodiment. In addition to these elements, the controller 20A has a third control quantity calculator 27 which is not provided in the first embodiment and a holding section 25A which has a slightly different function from that of the first embodiment.

The third control quantity calculator 27 has a function of calculating a third indicated current value I3 (refer to in FIG. 8E) which is higher by a second predetermined quantity than the first indicated current value I1, by adding the second predetermined quantity which is stored in the storage 26 to the first indicated current value I1. Here, the second predetermined quantity is set to a value which is smaller than the first predetermined quantity.

The holding section 25A has the same function as the holding section 25 of the first embodiment. In addition, the holding section 25A has a function of (i) switching an indicated current value from the second indicated current value I2 to the third indicated current value I3 if there is a rise in engine torque and (ii) switching the indicated current value from the third indicated current value I3 to the first indicated current value I1 if the engine has been restarted. Specifically, the holding section 25A determines as to whether or not the engine torque, which is input from the ECU 93, becomes equal to or larger than a predetermined value T1 (whether or not the engine torque has risen; refer to FIG. 8G). If it is determined that the engine torque has become equal to or larger than the predetermined value T1 (for example, at time t8 in FIG. 8G), the holding section 25A switches the indicated current value from the second indicated current value I2 to the third indicated current value I3 to thereby control the pressure regulators R.

Here, a period (between time t7 and time t8) from the restarting of the engine (at time t7) to the rise of the engine torque (at time t8) and a period (between time t7 and time t8) until the power supply voltage is recovered to a certain extent (substantially 50%) are substantially constant irrespective of a temperature condition and the like. Therefore, it is possible to determine as to whether or not the power supply voltage has been recovered to the certain extent by looking at the rise of the engine torque.

Then, in the second embodiment, if the power supply voltage is recovered to the certain extent in the way described above, the indicated current value is switched from the second indicated current value I2 to the third indicated current value I3, which is smaller than the second indicated current value I2. Therefore, as compared with the first embodiment, it is possible to further suppress the heat and load which are generated in and applied to the pressure regulators R.

Further, when the completed state determination section 24 determines that the engine has been restarted, the holding section 25A changes the indicated current value from the third indicated current value I3 to the first indicated current value I1 so as to hold the wheel cylinder pressure at the first indicated current value I1. It is noted that a control performed by the holding section 25A while the vehicle is in the idle stop state and a control performed by the holding section 25A in gradually reducing the indicated current value from the first indicated current value I1 are the same as those of the first embodiment.

Figure 7:
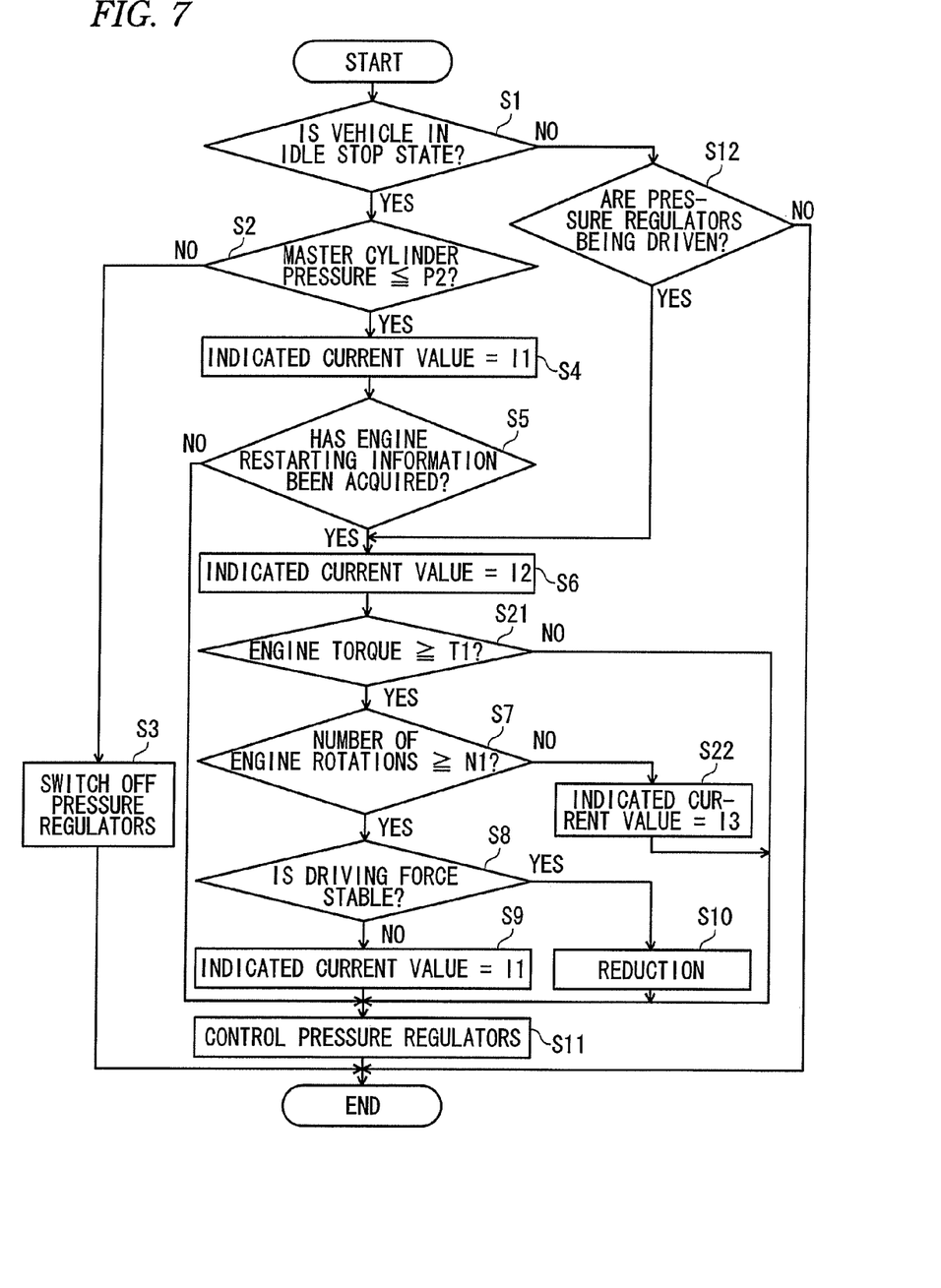
FIG. 7 is a flowchart showing operations of the controller according to the second embodiment.

Specifically, the controller 20A of the second embodiment executes the control according to a flowchart shown in FIG. 7. The flowchart shown in FIG. 7 is such that other processes (steps S21, S22) are added to the flowchart shown in FIG. 4. Therefore, the description of the same processes as those of the flowchart shown in FIG. 4 will be omitted here.

After having set the indicated current value to the second indicated current value I2 at step S6, the controller 20A determines as to whether or not the engine torque is equal to or larger than the predetermined value T1 (step S21). If it is determined at step S21 that the engine torque is smaller than the predetermined value T1 (No at step S21), the controller 20A controls the pressure regulators R at the second indicated current value I2, which is set at step S6 (step S11).

In addition, if it is determined at step S21 that the engine torque is equal to or larger than the predetermined value T1 (Yes at step S21), the controller 20A determines as to whether or not the number of engine rotations is equal to or lager than the predetermined value N1 (step S7). If it is determined at step S7 that the number of engine rotations is smaller than the predetermined value N1 (No at step S7), the controller 20A switches the indicated current value to the third indicated current value I3 (step S22) and controls the pressure regulators R at this third indicated current value I3 (step S11).

Next, an example of setting the indicated current value at which the pressure regulators R are controlled when the engine is restarted from the idle stop state will be described with reference to FIG. 8. It is noted that in FIG. 8, operations performed from time t1 to time t8 will be the same as those of the first embodiment. Therefore, the description thereof will be omitted here.

If the engine torque becomes equal to or larger than the predetermined value T1 (at time t8) as shown in FIG. 8G, the indicated current value is switched from the second indicated current value I2 to the third indicated current value I3. In this embodiment, by this switch of the indicated current values, the generation of heat in the pressure regulators R can be further suppressed between time t8 and time t9 than in the first embodiment. In addition, the indicated current value is not lowered to the first indicated current value I1 at time t8. Therefore, even if an actual current value should become a smaller value than the indicated current value due to a delay in recovering the power supply voltage, the third indicated current value I3, which is larger than the first indicated current value I1, prevents a situation in which the actual current value lowers below the first indicated current value I1 from taking place.

Figure 8A:
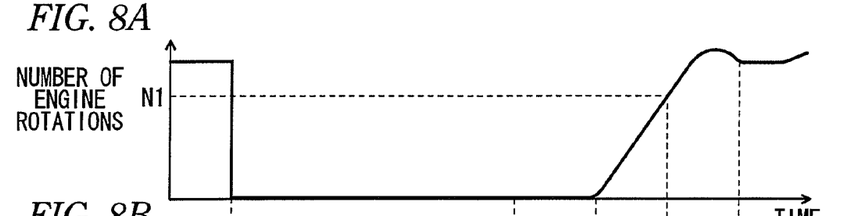
FIGS. 8A to 8G are time charts illustrating changes in parameters when the engine is restarted from the idle stop state in the second embodiment.
Figure 8B:
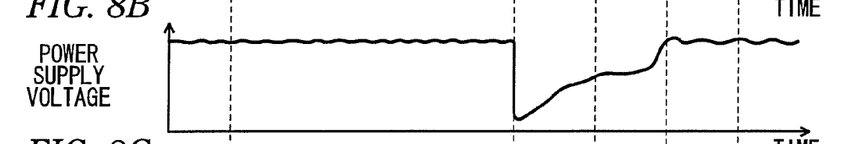
Figure 8C:
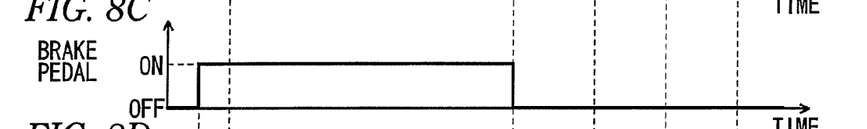
Figures 8D, 8E, 8F:
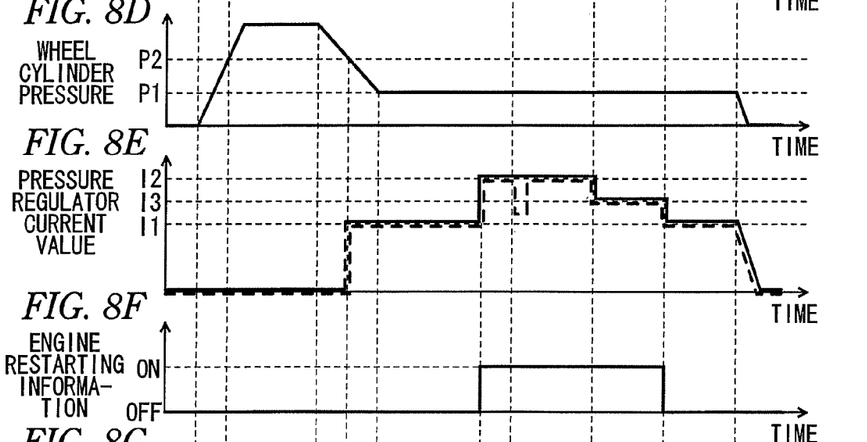
Figure 8G:
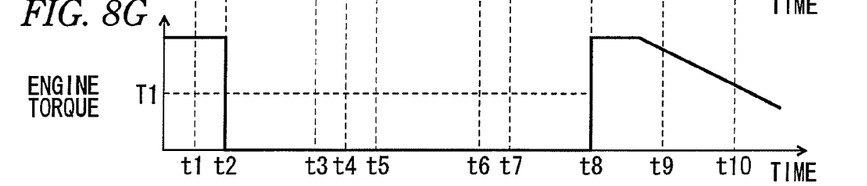

Thereafter, if the number of engine rotations becomes equal to or larger than the, predetermined value N1 as shown in FIG. 8A (at time t9), the indicated current value is switched from the third indicated current value I3 to the first indicated current value I1 as shown in FIG. 8E.

It is noted that the invention is not limited to the embodiments that have been described heretofore. The invention can be carried out in various forms which will be described below.

In the embodiments described above, the acquiring section 23 acquires the engine restarting information, which is output from the ECU 93. However, the invention is not limited thereto. For example, assuming that the idle stop operation is manually activated by the driver, the acquiring section 23 may acquire information indicating that the ignition switch is turned on as the engine restarting information. In addition, the indicated electric value may be switched to the second indicated current value (the second control quantity) not at the point in time at which the acquiring section 23 acquires the engine restarting information but immediately before the engine is restarted (that is, a predetermined period after the acquiring section 23 has acquired the engine restarting information). In other words, if the acquiring section acquires the engine restarting information, the holding section may start to hold the brake hydraulic pressure at the second control quantity at an arbitrary timing from the point in time at which the engine restarting information is so acquired to the point in time at which the engine is restarted and continue to hold the brake hydraulic pressure at the second quantity at least until the power supply voltage is recovered to the certain extent.

In the embodiments described above, while the value of the current which is supplied to the pressure regulators R is described as the example of the control quantity, the invention is not limited thereto. For example, when the brake hydraulic pressure is held by an electric booster while the vehicle is in the idle stop state, a value of a current supplied to the electric booster may be the control quantity.

What is claimed is:

1. A vehicle brake hydraulic pressure control apparatus that can hold a brake hydraulic pressure when a vehicle is stopped, the apparatus comprising:
    an acquiring section that acquires engine restarting information;

a first control quantity calculator that, when the vehicle is stopped, calculates a first control quantity which corresponds to a brake hydraulic pressure to hold a stopped state of the vehicle;

a second control quantity calculator that calculates a second control quantity which is larger by a predetermined quantity than the first control quantity; and a holding section that holds the brake hydraulic pressure while the engine is stopped, wherein if the brake hydraulic pressure lowers to a predetermined pressure after the engine is stopped, the holding section holds the brake hydraulic pressure with the first control quantity, if the acquiring section acquires the engine restarting information, the holding section holds the brake hydraulic pressure with the second control quantity, and if the restarting of the engine is completed, the holding section holds the brake hydraulic pressure with the first control quantity.

2. The vehicle brake hydraulic pressure control apparatus according to claim 1, wherein the holding section holds the brake hydraulic pressure with the second control quantity at a point in time at which the acquiring section acquires the engine restarting information.

3. The vehicle brake hydraulic pressure control apparatus according to claim 1, wherein the first and second control quantities are values of currents which are supplied to a proportional solenoid valve which can control the brake hydraulic pressure.

4. The vehicle brake hydraulic pressure control apparatus according to claim 2, wherein the first and second control quantities are values of currents which are supplied to a proportional solenoid valve which can control the brake hydraulic pressure.

5. The vehicle brake hydraulic pressure control apparatus according to claim 1, wherein the first control quantity corresponds to a wheel cylinder pressure P1 to maintain the stopped state of the vehicle.

6. The vehicle brake hydraulic pressure control apparatus according to claim 5, wherein the second control quantity is calculated by adding a first predetermined quantity to the first control quantity.

7. A vehicle brake hydraulic pressure control apparatus that can hold a brake hydraulic pressure when a vehicle is stopped, the apparatus comprising:

an acquiring section that acquires engine restarting information;

a first control quantity calculator that, when the vehicle is stopped, calculates a first control quantity which corresponds to a brake hydraulic pressure to hold a stopped state of the vehicle;

a second control quantity calculator that calculates a second control quantity which is larger by a predetermined quantity than the first control quantity; and a holding section that holds the brake hydraulic pressure while the vehicle is stopped, wherein if the brake hydraulic pressure lowers to a predetermined pressure after the vehicle is stopped, the holding section holds the brake hydraulic pressure with the first control quantity, if the acquiring section acquires the engine restarting information, the holding section holds the brake hydraulic pressure with the second control quantity, and if the restarting of the engine is completed, the holding section holds the brake hydraulic pressure with the first control quantity, wherein the first control quantity corresponds to a wheel cylinder pressure P1 to maintain the stopped state of the vehicle, wherein the second control quantity is calculated by adding a first predetermined quantity to the first control quantity, and wherein the first predetermined quantity is a value that prevents an actual current value which flows to pressure regulators from lowering below the first control quantity due to a supply voltage which is lowered temporarily when the engine is restarted.

8. The vehicle brake hydraulic pressure control apparatus according to claim 7, wherein the acquiring section acquires the engine restarting information at a point in time before the engine is actually restarted, and when the restarting of the engine is completed an output of the engine restarting information is stopped.

9. The vehicle brake hydraulic pressure control apparatus according to claim 8, further comprising a completed state determination section which determines whether or not the restarting of the engine is completed based on one of a number of engine rotations becoming a predetermined value N1 or larger and whether or not the output of the engine restarting information becomes OFF.

10. The vehicle brake hydraulic pressure control apparatus according to claim 9, wherein a time from a point in time at which the engine is restarted to a point in time at which the number of engine rotations reaches the predetermined value N1 and a time period until a power supply voltage is recovered to substantially 100% are substantially constant irrespective of a temperature condition.

11. A vehicle brake hydraulic pressure control apparatus that can hold a brake hydraulic pressure when a vehicle is stopped, the apparatus comprising:

an acquiring section that acquires engine restarting information;

a first control quantity calculator that, when the vehicle is stopped, calculates a first control quantity which corresponds to a brake hydraulic pressure to hold a stopped state of the vehicle;

a second control quantity calculator that calculates a second control quantity which is larger by a predetermined quantity than the first control quantity; and a holding section that holds the brake hydraulic pressure while the vehicle is stopped, wherein if the brake hydraulic pressure lowers to a predetermined pressure after the vehicle is stopped, the holding section holds the brake hydraulic pressure with the first control quantity, if the acquiring section acquires the engine restarting information, the holding section holds the brake hydraulic pressure with the second control quantity, and if the restarting of the engine is completed, the holding section holds the brake hydraulic pressure with the first control quantity, wherein when it is deter mined that the vehicle is stopped, the holding section determines as to whether or not a master cylinder pressure output from a pressure sensor becomes a predetermined value P2 or lower.

12. The vehicle brake hydraulic pressure control apparatus according to claim 11, wherein when the wheel cylinder pressure becomes the predetermined value P2 or lower while the vehicle is stopped, the holding section sets an indicated current value for pressure regulators to the first control quantity.

13. The vehicle brake hydraulic pressure control apparatus according to claim 11, wherein when a wheel cylinder pressure lowers to the predetermined value P2 during a period from a point in time at which idle stop operation is started to a point in time at which the engine is restarted, the holding section holds the wheel cylinder pressure at the first control quantity.

14. The vehicle brake hydraulic pressure control apparatus according to claim 9, wherein
when the completed state determination section determines that the restarting of the engine is completed, the holding section determines as to whether or not a driving force of the engine becomes stable based on a number of engine rotations,
if it is determined that the driving force of the engine is not stable, the holding section sets an indicated current value to the first control quantity, and
if it is determined that the driving force of the engine becomes stable, the holding section lowers the indicated current value from the first control quantity.

15. The vehicle brake hydraulic pressure control apparatus according to claim 14, wherein the determining whether or not the driving force of the engine becomes stable, comprises determining whether or not a variation in engine speed per unit time becomes a predetermined value or lower and determining whether or not an output of a torque converter becomes a constant value or larger.

\* \* \* \* \*